H. LEMP.
WELDING THIN TUBING.
APPLICATION FILED SEPT. 16, 1907.

956,984.

Patented May 3, 1910.

Witnesses:
W. Ray Taylor.
J. Ellis Glen.

Inventor,
Hermann Lemp,
By Albert G. Davis
Att'y.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

WELDING THIN TUBING.

956,984.

Specification of Letters Patent.

Patented May 3, 1910.

Application filed September 16, 1907. Serial No. 393,034.

*To all whom it may concern:*

Be it known that I, HERMANN LEMP, a citizen of the United States, residing at Lynn, in the county of Essex, State of Massachusetts, have invented certain new and useful Improvements in Welding Thin Tubing, of which the following is a specification.

This invention relates to the art of electric welding, and its object is to enable lengths of metallic tubing having thin walls to be successfully welded together at their ends by butt joints.

The invention is especially advantageous in the case of tubes of an easily fusible material, or one sensitive to abnormal temperature, such as some alloys, and even more so when both of these conditions are present. I obviate the difficulties heretofore existing in this connection by surrounding the end of each section of the tube with a sleeve or jacket of considerable thickness composed of easily weldable material, and then welding the abutting ends of two such sections, the sleeves and the tubes all participating in the weld. In this way a proper alinement of the sections can be insured and the heat is sufficiently distributed to prevent the melting of the thin tube.

Figure 1:
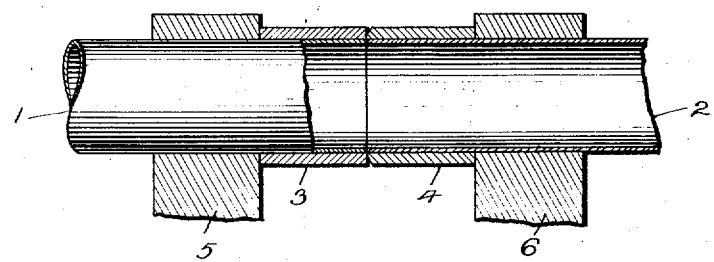
Figure 2:
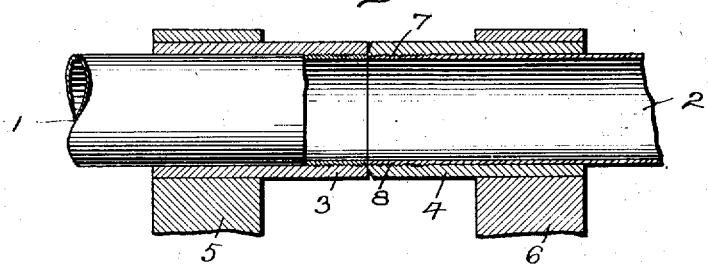
Figure 3:
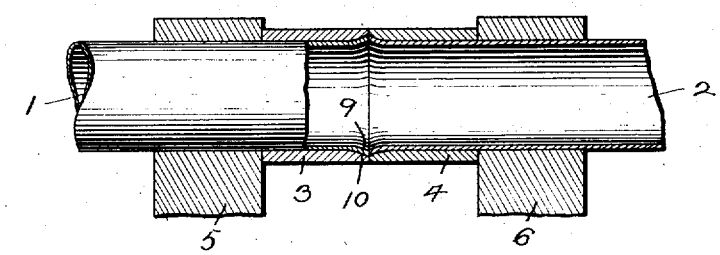

In the accompanying drawing, Figure 1 is a longitudinal section of a joint welded in accordance with my invention; Figs. 2 and 3 show modifications of the same.

The sections 1 and 2 of thin metallic tubing are placed end to end, and the abutting portions are surrounded by short sleeves or jackets 3 and 4 considerably thicker than the tube, and made of an easily weldable material, such as low carbon steel. The jackets terminate preferably coincidently with the tube sections, so that the parts all meet in the same transverse plane. The copper clamps 5, 6 of the welding machine are pinched upon the tube sections and abut against the jackets, thereby insuring the direct transmission of current to both parts. Owing to the ease with which the thick jackets can be alined and welded, the inner tube will be safely cared for and yet is assured of receiving sufficient current to weld it, but without requiring the operator to exercise unusual precautions in manipulation, and in regulation of the current.

In Fig. 2 the jackets are provided with internal tapering screw-threaded end portions 7 which engage with similar tapering externally screw-threaded end portions 8 on the tube sections, so that each jacket will make a comparatively tight joint with its tube and will also afford mechanical support and strength. In this case, the terminal clamps 5, 6 can be applied to the jackets alone, as the mechanical joint between the jacket and tube will insure a flow of current through the tube.

Fig. 3 shows a further modification in which the end of each tube section is slightly flared at 9, and the jacket is counterbored at 10 to fit it. This prevents the possible formation of a bead on the inside of the joint when the ends of the tube soften and weld.

The invention is particularly advantageous in welding tubing of nickel alloys having from twenty-five to thirty per cent. nickel. In order to weld such an allow successfully by ordinary methods, special precautions are necessary, and the temperature must be kept below a certain degree. But with my invention, using jackets preferably like those shown in Fig. 2, made of an easily weldable low carbon steel, and of large dimensions, the nickel alloy tubing can be joined as readily as steel alone.

What I claim as new and desire to secure by Letters Patent of the United States, is,—

1. The method of electrically welding sections of thin metallic tubing which consists in inclosing the ends of said sections in jackets of weldable material, bringing said ends into contact and simultaneously welding the abutting ends of the tubing and of the jackets.

2. The method of electrically welding sections of thin metallic tubing, which consists in providing each end of each section with a separate inclosing jacket of weldable material and considerably thicker than said tubing and then welding the ends while so enveloped by passage of current through both tubing and jackets.

3. The method of electrically welding sections of thin metallic tubing, which consists in providing each of the abutting ends of said sections with a jacket of weldable material, bringing the ends to be welded into contact under pressure and then passing a heavy current through both the abutting end of tubing and jacket.

4. The method of electrically welding sections of thin metallic tubing, which consists in mechanically attaching to the end of each section a jacket of weldable material, and then welding the ends by passage of current while so enveloped.

5. The method of electrically welding sections of thin metallic tubing, which consists in tapering the ends of said sections and providing them with external screw-threads, counterboring the end of a jacket of weldable material and providing it with internal screw-threads, uniting said section and jacket by screwing them together, abutting the ends of such jacketed tube sections, and welding said ends by passage of current.

In witness whereof, I have hereunto set my hand this eleventh day of September, 1907.

HERMANN LEMP.

Witnesses:
JOHN A. MCMANUS, Jr.,
HENRY O. WESTENDARP.